United States Patent
Kretschmer et al.

(10) Patent No.: US 8,899,884 B2
(45) Date of Patent: Dec. 2, 2014

(54) METERING SYSTEM, DENSE PHASE CONVEYING SYSTEM AND METHOD FOR SUPPLYING BULK MATERIAL IN POWDER FORM

(75) Inventors: Horst Kretschmer, Weißenborn (DE); Jörg Kleeberg, Freiberg (DE); Dietmar Rüger, Bannewitz-Goppeln (DE); Olaf Schulze, Tuttendorf (DE); Christian Eichhorn, Freiberg (DE)

(73) Assignee: Linde AG, München (DE)

( * ) Notice: Subject to any disclaimer, the term of this patent is extended or adjusted under 35 U.S.C. 154(b) by 117 days.

(21) Appl. No.: 13/500,379

(22) PCT Filed: Oct. 8, 2010

(86) PCT No.: PCT/EP2010/006150
§ 371 (c)(1),
(2), (4) Date: Jun. 29, 2012

(87) PCT Pub. No.: WO2011/042194
PCT Pub. Date: Apr. 14, 2011

(65) Prior Publication Data
US 2012/0266966 A1    Oct. 25, 2012

(30) Foreign Application Priority Data
Oct. 10, 2009    (DE) .......................... 10 2009 048 961

(51) Int. Cl.
| | | |
|---|---|---|
| B65G 51/08 | (2006.01) | |
| C10J 3/72 | (2006.01) | |
| F23K 3/02 | (2006.01) | |
| F27D 3/10 | (2006.01) | |
| C10J 3/50 | (2006.01) | |
| B65G 53/46 | (2006.01) | |
| B65G 53/30 | (2006.01) | |
| C21B 5/00 | (2006.01) | |
| C21B 5/02 | (2006.01) | |
| C21C 5/52 | (2006.01) | |
| F27D 99/00 | (2010.01) | |

(52) U.S. Cl.
CPC ............. *C10J 3/723* (2013.01); *B65G 53/4691* (2013.01); *B65G 53/30* (2013.01); *C21B 5/003* (2013.01); *C21B 5/023* (2013.01); *C21C 5/527* (2013.01); *F23K 3/02* (2013.01); *F27D 3/10* (2013.01); *F27D 2099/0051* (2013.01); *C10J 3/503* (2013.01); *C10J 2200/152* (2013.01)
USPC .............................. 406/10; 406/123; 406/124

(58) Field of Classification Search
USPC ............ 406/10, 123, 124, 125, 126, 134, 138
See application file for complete search history.

(56) References Cited

U.S. PATENT DOCUMENTS 3,167,421 A * 1/1965 Pfeiffer et al. .................. 75/330
3,485,535 A * 12/1969 Fabre ............................... 406/61

(Continued)

FOREIGN PATENT DOCUMENTS

| CN | 1058922 A | 2/1992 |
| DE | 27 11 114 A1 | 9/1978 |

(Continued)

OTHER PUBLICATIONS

International Preliminary Report on Patentability, PCT/EP2010/006150, Apr. 19, 2012, 12 pgs.

(Continued)

*Primary Examiner* — William R Harp
(74) *Attorney, Agent, or Firm* — Paul D. Strain, Esq.; Strain & Strain PLLC (57) ABSTRACT

The present application relates to a metering device and a dense phase conveying system for the steady, continuous, dosed supply of a bulk material in powder form made of light, polydisperse particles to a consumer arranged downstream. Furthermore, the present application relates to a method for the continuous, dosed supply of the bulk material in powder form using the dense phase conveying system, which comprises the metering device according to the invention.

13 Claims, 2 Drawing Sheets

(56) References Cited

U.S. PATENT DOCUMENTS

| | | | |
|---|---|---|---|
| 3,689,045 A * | 9/1972 | Coulter et al. | 266/82 |
| 3,994,701 A * | 11/1976 | Schweimanns | 406/175 |
| 4,073,628 A * | 2/1978 | Gernhardt et al. | 48/62 R |
| 4,389,244 A * | 6/1983 | Yaroshevsky et al. | 75/460 |
| 4,482,275 A * | 11/1984 | Shinozaki et al. | 406/12 |
| 4,570,552 A * | 2/1986 | Rachner et al. | 110/347 |
| 4,582,454 A * | 4/1986 | Brandenburg et al. | 406/32 |
| 4,593,727 A * | 6/1986 | Ulveling | 141/5 |
| 4,758,118 A | 7/1988 | Rachner et al. | |
| 5,285,735 A * | 2/1994 | Motoi et al. | 110/101 CB |
| 2007/0074643 A1 | 4/2007 | Tietze et al. | |
| 2007/0079554 A1 | 4/2007 | Schingnitz et al. | |
| 2010/0126068 A1 | 5/2010 | Schingnitz et al. | |

FOREIGN PATENT DOCUMENTS

| | | | |
|---|---|---|---|
| DE | 27 14 355 A1 | 10/1978 | |
| DE | 27 23 542 A1 | 12/1978 | |
| DE | 28 31 208 A1 | 3/1979 | |
| DE | 139 271 A1 | 12/1979 | |
| DE | 32 11 045 A1 | 2/1983 | |
| DE | 268 835 C2 | 10/1990 | |
| DE | 4225483 A1 * | 2/1994 | B65G 53/58 |
| DE | 10 2005 047 583 A1 | 4/2007 | |
| DE | 10 2007 020 332 A1 | 11/2008 | |
| DE | 10 2008 012 733 A1 | 9/2009 | |
| EP | 0 235 562 A2 | 9/1987 | |
| EP | 0 499 771 A1 | 8/1992 | |
| GB | 1 598 169 A | 9/1981 | |
| SU | 1492184 A1 | 7/1989 | |
| SU | 1734576 A3 | 5/1992 | |
| WO | WO 2009/109297 A2 | 9/2009 | |
| WO | WO 2009/109297 A3 | 9/2009 | |

OTHER PUBLICATIONS

Scheidig et al., "Anwendung der Dichtstromförderung zum Einblasen von Braunkohlenbrennstaub in den Hochofen nach dem KOSTE-Verfahren", Neue Hütte, Zeitschrift für Entwicklung, Gewinnung, Umformung and Prüfung metallischer Werkstoffe, vol. 28, No. 12 (1983), pp. 441-444.

International Search Report, PCT/EP2010/006150, May 23, 2011, 3 pgs.

English translation of Chinese Office Action, Appl. No. 201080052717.0, Dec. 3, 2013, 8 pgs.

Russian Office Action, Appl. No. 2012117505/06(026367), Jul. 15, 2014, 9 pgs.

* cited by examiner

METERING SYSTEM, DENSE PHASE CONVEYING SYSTEM AND METHOD FOR SUPPLYING BULK MATERIAL IN POWDER FORM

CROSS-REFERENCE TO RELATED PATENT APPLICATIONS

This application is a National Stage of International Application No. PCT/EP2010/006150, filed Oct. 8, 2010, which is based upon and claims the benefit of priority from prior German Patent Application No. 10 2009 048 961.4, filed Oct. 10, 2009, the entire contents of all of which are incorporated herein by reference in their entirety.

The following invention relates to a metering device and a dense phase conveying system for the steady, continuous, dosed supply of a bulk material in powder form made of light, polydisperse particles to a consumer arranged downstream. Furthermore, the invention relates to a method for the continuous, dosed supply of the bulk material in powder form using the dense phase conveying system, which comprises the metering device according to the invention.

A system configuration made of bunkers, locks (airlocks), metering containers, and typically multiple parallel conveying tubes, which lead from the metering container to multiple dust burners, are used for pneumatic thin phase and dense phase conveying systems for the supply of pulverized fuel in entrained flow gasification reactors or other consumer or reactor systems, such as blast furnaces, cupola furnaces, etc. The mass flow regulation is performed by means of the differential pressure between the metering container and the reaction pressure in the consumer.

The total mass flow is ascertained by means of a weighing system on the metering container, the mass flows in the individual conveying tubes are determined from individual measurements of the flow density and the flow speed. Deviations of individual conveying tubes from the proportional total mass flow are corrected by auxiliary gas feed into the conveying part. Such pulverized fuel supply systems, which are suitable for bulk materials having bulk densities greater than 450 kg/m$^3$, are described, for example, in DE 28 31 208, DE 32 11 045, DD 268 835, DE 10 2005 047 583 A1, DD 139 271 and by K. Scheidig et al. in "Neue Hütte [New Metallurgy]" Leipzig, December 1983, pages 441-442.

However, a continuous supply of light dusts, which have bulk densities less than 450 kg/m$^3$, is not possible or is only possible to a limited extent using the methods known from the prior art. Such light dusts, which are polydisperse with respect to the particle shape, arise during the thermal pretreatment of renewable fuels, which are already light per se, such as wood, hay, and other biomasses. These renewable fuels can thus decompose into manifold shapes during the thermal pretreatment by spontaneous drying, degasification, or splitting or during the hydrothermal carbonization of biomasses, and obtain a porous structure. The shape of the dust particles and the porous structure have the result that these dusts have bulk density values of 150 to 400 (450) kg/m$^3$ and void volumes of up to 94% of the bulk volume. A gross density of 200 to 800 kg/m$^3$ is a decrease in relation to the true density of 800 to 2, 500 kg/m$^3$. These light dusts no longer follow the gravity flow when flowing out of containers such as a bunker or metering containers, they form wedges and only have a very low flowability. Fluidization results in strong swirling and blowing away of this dust before the outlet openings, as well as strong dilution effects, in the final effect even in actual gas breakthroughs. The supply of pulverized biomasses and cokes to a consumer is addressed in DE 10 2005 047 583 A1, however, which discloses a corresponding method and a device. The device comprises, in addition to pressure airlocks and a metering vessel, a plurality of corresponding conveying tubes connected to the consumer. The dust quantity flowing therein in the conveying lines to the consumer is measured and regulated via regulating valves, delivery devices being provided for each conveying line. The differential pressure between consumer and metering vessel is to be detected therein to maintain a constant dust flow.

Proceeding from this prior art, the present invention is based on the object of providing a metering device which allows a continuous, dosed supply of such a bulk material in powder form made of light, polydisperse particles, independently of the reaction pressure which prevails in a consumer arranged downstream and which is additionally suitable for retrofitting existing supply systems.

This object is achieved by a metering device having the features of independent claim 1.

A further object of the invention comprises providing a dense phase conveying system, which is improved and expanded with respect to the supply of light dusts having bulk densities less than 450 kg/m$^3$, and which can be provided for the steady and continuous metering of the light dusts with the least possible cost expenditure.

This object is achieved by the dense phase conveying system having the features of claim 10.

A method for the steady and continuous dosed supply of these light dusts is disclosed by the features of claim 11.

Further embodiments of the objects of the invention are described by the subclaims.

A first embodiment of the invention relates to a metering device for the steady, continuous, dosed supply of a bulk material in powder form made of light, polydisperse particles, which have a void volume in a range up to 94% and a gross density of 200 to 800 kg/m$^3$, from a supply device such as a bunker or a central supply system into multiple conveying tubes, which lead to a consumer arranged downstream. This metering device comprises a metering container and an (air) lock arranged upstream. However, multiple (air)locks can also be provided, which are supplied with bulk material by the supply device and relay it to the metering container. Both the metering container and also the airlock each have a delivery device, which ensures that the bulk material of light particles steadily enters the metering container, and is dosed therefrom uniformly distributed to the conveying tubes, the flow density of the dust conveying streams being nearly at values of the bulk density at least at the beginning of the conveying tubes. For this purpose, the delivery device of the metering container has a number of dust flow regulation devices, which each open into one of the conveying tubes, corresponding to a number of the conveying tubes. In addition, a mass flow measuring probe is arranged on each conveying tube, which are each coupled to the dust flow regulation device, which opens into the corresponding conveying tube. The steady entry of the bulk material from the airlock into the metering container is ensured by the delivery device of the airlock, which opens via a dust flow regulation device into the metering container.

In order to be able to keep the operating pressure for the continuous metering of the bulk material from the metering container into the conveying tubes constant or regulate it as a function of the desired conveyance mass flow in the individual tubes, which is settable by the pressure differential between the consumer and the metering container, the metering device preferably has a pressure regulation device, which is operatively coupled to multiple pressure measuring devices. For the regulation of the pressure differential required for the conveyance mass flow between metering container and consumer, the pressure regulation device is coupled to a pressure measuring device of the metering container, which is arranged on its delivery device, and a pressure measuring device of the consumer. In order to ensure the continuous conveyance of the bulk material from the supply device into the airlock and from the airlock into the metering container, further pressure measuring devices of the supply device, the airlock, and the metering container are also arranged, so that the differential pressure between the airlock and the metering container can be regulated by a differential pressure regulation of the pressure regulation device, while the differential pressure between the supply device and the airlock is controlled by the pressure regulation device. The airlock pressure is controlled or regulated by the pressure regulation device as a function of a metering container fill level, an airlock fill level, the pressure differential regulation between airlock and metering container, and the differential pressure control between supply device and the airlock, in that the pressure regulation device is coupled to one or more actuating devices for changing the pressure in the airlock. The respective pressure differential between supply device and airlock, or between airlock and metering container, determines the filling intensity or filling speed. One of the actuating devices activates a suction device and opens valves in the line from the airlock to the suction device, whereby the airlock pressure can be reduced.

Furthermore, the pressure regulation device can also activate the coupled dust flow regulation device of the airlock delivery device as a function of the metering container fill level and airlock fill level and of the pressure differential between airlock and metering container. The control or regulation of the metering container pressure in turn, and therefore also the pressure differential between airlock and metering container, optionally also of the airlock pressure, is performed as a function of the differential pressure between the delivery device of the metering container and the consumer, so that the delivery pressure in the delivery device of the metering container or the pressure differential responsible for the conveyance mass flow to the consumer can be kept constant.

Thus, according to the invention, the pressure in the airlock is controlled by the pressure regulation device as a function of a metering container fill level, an airlock fill level, and the pressure differential between metering container and airlock, the airlock being depressurized for filling with the bulk material and being pressurized in relation to the metering container for conveying the bulk material into the metering container. The metering container delivery pressure to be set, which is primarily a function of the consumer pressure and also a pressure loss of the desired mass flow in the conveying tubes, because of which the pressure regulation device is also operatively coupled to the mass flow measuring probes in the conveying tubes or to a measuring device for the total mass flow, such as a weighing device of the metering container, therefore represents the control parameter of the pressure regulation device for the metering container pressure and therefore for the differential pressure between airlock and metering container. Using this metering device, it is possible to supply the bulk material made of light particles into a metering container, to which operating pressure is applied, in such a manner that a continuous, dosed supply of the light, polydisperse dusts is provided by the dust flow regulation devices in the conveying tubes to the consumer, which can be a reaction system having arbitrary pressure.

The pressure regulation device can actuate a plurality of regulating and shutoff valves for this purpose in a pressurization/compensation gas line, a depressurization gas line, and a swirl gas line or acceleration and delivery gas line, which open into the metering container, by means of corresponding actuating devices. A pressurization gas is used for the pressure increase to operating pressure, depressurization gas is released for pressure reduction, and the use of compensation gas serves for pressure stabilization and pressure regulation of the metering container. The pressure regulation device simultaneously controls the airlock pressure, which varies as a function of the airlock fill level between a partial vacuum in relation to the supply device at an airlock fill level minimum and an overpressure in relation to the metering container operating pressure at an airlock fill level maximum. The pressure regulation device can actuate a plurality of regulating and shutoff valves in a pressurization gas line, a depressurization gas line, and a swirl gas line or acceleration and delivery gas line, which lead to an airlock, as well as a suction device, such as a ventilator, which can be coupled via the depressurization gas line to the airlock and which is capable of generating a partial vacuum in the airlock in relation to a pressure in the supply device, by means of suitable actuating devices.

The airlock and the metering container can be connected via a filling line, which is openable by a closing device. The closing device can advantageously be actuated by a control device, which can be part of the pressure regulation device, as a function of the airlock pressure, the metering container pressure, the metering container fill level, and/or the airlock fill level. This control device can additionally operatively couple the closing device to the dust flow regulation device of the airlock, and can therefore provide a filling mass flow into the metering container, which is a function of the fill levels in the metering container and the airlock, but also of the metering container pressure or the pressure differential between metering container and airlock.

In one embodiment, the delivery device of the metering container can be equipped with a swirl floor (fluidized bed), above which a stirring device is arranged. The acceleration and delivery gas line (swirl gas line) opens below the swirl floor (fluidized bed) into the metering container delivery device. Furthermore, each dust flow regulation device of the delivery device can comprise an assigned closure device, and the dust flow regulation devices can be coupled to a pressure measuring device of the metering container and to a measuring device for a total mass flow, for example, a weighing system.

In a further embodiment, the delivery device of the airlock can comprise a ventilation device such as a porous sintered metal tube, the swirl gas line opening into the ventilation device. The ventilation device can be coupled to the pressure regulation device, and can therefore be activated as a function of the metering container and airlock fill levels and the pressure differential between airlock and metering container or the airlock pressure, if the dust conveyance is to occur from the airlock into the metering container. In addition, the airlock delivery device can have a closure device, which can also be coupled to the pressure regulation device, which can be arranged between the ventilation device and the dust flow regulation device or also downstream from the dust flow regulation device in the filling line to the metering container.

Both the dust flow regulation device of the airlock and also the dust flow regulation devices of the metering container can have a smooth and wear-resistant flow channel having an adjustable flap, which is actuated via a fine actuator, the cross section of the flow channel steadily decreasing downstream.

A preferred arrangement of the compensation gas line on the metering container and the pressurization gas line on the airlock can be implemented horizontally in one embodiment, the compensation gas line opening into the metering container above a dust bulk fill present over the swirl floor and the pressurization gas line opening into the airlock above the dust bulk fill provided over the delivery device or the ventilation device, so that a compensation gas and a pressurization gas can be introduced diffusely distributed and thus only minimally swirl the dust of the bulk fill.

A further object of the invention relates to an embodiment of a dense phase conveying system for the steady, continuous, dosed supply of a bulk material in powder form made of light, polydisperse particles. Such a dense phase conveying system comprises a supply device, for example, a bunker, a metering device according to the invention, which contains a metering container and at least one airlock, each having a delivery device, and conveying tubes. The bunker is connected to the airlock of the metering device, and the conveying tubes extend from the metering container to a consumer.

The bunker has a ventilation element and a bunker delivery device, which is connected via a closable filling line to the airlock. The ventilation element, and also the bunker delivery device and the filling line can be coupled to the pressure regulation device for controlled filling of the airlock from the bunker, while filling of the bunker occurs from the bulk material supply in a manner controlled by the bunker fill level. If multiple airlocks are provided, a corresponding number of bunker delivery devices can also be provided. An existing conveying system can thus be retrofitted to form the dense phase conveying system according to the invention, in that one or more airlocks are interconnected between the supply device and the metering container, and bunker and metering container are retrofitted using the corresponding delivery devices. The pressure regulation device according to the invention is coupled to the airlock using the suction device, which can be a ventilator, for example, and the control device of the metering device is integrated.

To provide the partial vacuum in the airlock in relation to a pressure in the supply device, the dense phase conveying system comprises the suction device, which can be a ventilator device and which can be connected to the airlock as a function of an airlock fill level and can be actuated by the pressure regulation device.

A method according to the invention for the steady, continuous dosed supply of a bulk material in powder form made of light, polydisperse particles can be carried out employing a dense phase conveying system according to the invention by coupled, adapted operation of the airlock and the metering container of the metering device. The airlock and the metering container have bulk material applied thereto alternately and successively in a manner controlled as a function of the airlock fill level and the metering container fill level, in that the airlock, when the bulk material therein reaches a fill level minimum, is depressurized and has a partial vacuum applied thereto in relation to the supply device, in that the ventilator device is put into operation, so that the bulk material is transferred into the airlock until a fill level maximum is achieved therein, so that corresponding valves to the supply device and to the ventilator device are closed and corresponding valves in the pressurization gas line and/or the acceleration/delivery gas line (swirl gas line) are opened, so that pressurization gas and/or swirl gas having an overpressure in relation to the operating pressure of the metering container is applied to the airlock. The airlock is thus operationally ready for filling the metering container. This occurs when the bulk material in the metering container reaches a fill level minimum, upon which the control device, in an operatively coupled manner, opens the closing device of the filling line between the fully filled airlock, to which partial vacuum is applied, and the metering container, and the dust flow regulation device actuates the airlock in a controlled manner and thus provides a steady filling mass flow into the metering container.

By achieving a fill level maximum in the metering container, the closing device of the filling line is closed again by the control device and the airlock can be depressurized again for further filling.

If multiple airlocks are connected between supply device and metering container in order to also continuously manage larger metering quantities, they can alternately fill the metering container and be filled themselves.

This method advantageously allows the delivery pressure in the metering container to be kept constant in normal metering operation and also during filling and therefore allows a conveyance of the bulk material into the conveying tubes and constant maintenance of the mass flows in the conveying tubes using a stable differential pressure between metering container and consumer and/or using the dust flow regulation devices of the metering container to be achieved and thus allows the steady, continuous, dosed supply to the consumer to be provided. The measurement of the metering container delivery pressure in the delivery device and the readjustment of the metering container, which is dependent thereon and is required above all during the filling procedure from the airlock, allows steady and error-free metering. The change of the hydrostatic pressure in the metering container induced by the filling procedure and the fill level reduction during the metering advantageously does not have an effect on the delivery pressure according to the invention, which provides the constant mass flow to the consumer, if the pressure measuring device for the metering container delivery pressure is installed on the delivery device of the metering container and is coupled to the pressure regulation device for readjusting the metering container pressure.

The present invention therefore offers the advantages that the steady dust flow from the bunker to the airlock, from the airlock to the metering container, and at its outlet to the conveying tubes is induced by forced flow forces using pressure differentials and using ventilation of the bulk material, because the gravity flow is inadequate as a result of the low bulk and gross density values. Furthermore, because the flow forces are used, large entry and exit cross sections, and therefore also large high-pressure ball valves/valves, are omitted on the bunker, on the airlocks, and on the metering containers. The invention also allows a continuous dust conveyance of light bulk materials after a refitting, which is easy to perform, in existing systems.

These and further advantages are illustrated by the following description with reference to the appended figures.

The reference to the figures in the description is used to assist the description. Objects or parts of objects which are essentially identical or similar can be provided with the same reference numerals. The figures are merely schematic illustrations of exemplary embodiments of the invention. In the figures.

The method according to the invention provides, employing a dense phase conveying system having metering device according to the invention, the continuous, dosed supplies of light, polydisperse dusts into gasification reactors, but also into other reaction chambers of arbitrary operating pressure, e.g., blast furnaces, cupola furnaces.

The dust is supplied to a bunker, therefrom to one or more airlocks and a metering container, from a central repository such as a dryer, carbonization plant/degasser by means of pneumatic or mechanical conveyors. During the supply into the bunker, a partial vacuum is forced in the bunker by means of a ventilator/suction filter, in order to exhaust the introduced carrier gas of the dust stream. The filling of the airlocks is not performed by gravity flow, but rather with the aid of flow forces which are initiated by applying a partial vacuum in the airlock in relation to the bunker using the ventilator/suction filter.

The otherwise typical pressure equalization required in the case of gravity flow is bypassed and is replaced according to the invention by a combination of a ventilation device over the bunker outlet and a delivery device after the bunker outlet. The ventilation device is provided by an arched arrangement of porous sintered metal tubes. The delivery device is preferably a throttle device such as a Y-type valve, a butterfly valve (a rotary shutter), or a rotary valve (a cellular wheel sluice), which prevents the breakthrough of gas. After emptying of the airlock, it is depressurized and a partial vacuum is generated in relation to the pressure in the bunker by means of a suction device such as a ventilator. The filling of the airlock with bulk material up to an airlock fill level maximum is performed by the differential pressure between airlock and bunker. The airlock is then pressurized with a slight overpressure in relation to the metering container pressure, so that the differential pressure between airlock and metering container causes a forced flow for the bulk material in the direction of the metering container. The filling of the metering container using the dust from the airlock, which is filled as described to the maximum fill level and is pressurized at least to the metering container operating pressure, is requested by the minimum fill level detector of the metering container.

The filling according to the invention of the metering container comprises, in greater detail, slightly ventilating the airlock using the ventilation device of the airlock delivery device and setting and regulating an overpressure in the airlock in relation to the metering container by applying pressurization gas or acceleration/delivery gas. The dust flow regulating unit of the airlock is then opened and the closure device under the airlock, which can be a ball valve, is opened, the degree of opening of the dust flow regulating unit resulting from the required refilling time. A filling mass flow into the metering container can be set as much greater than the conveyor stream to the consumer, but it can also be limited if the filling increases the pressure in the metering container over the target value of the metering container pressure. The overpressure in the metering container, which results with the refilling driven by the airlock overpressure, is dissipated using the differential pressure regulation between airlock and metering container by the pressure regulation device via the opening of corresponding regulating valves in the depressurization gas line of the metering container and the depressurizing gas is exhausted via a pressure filter, so that the metering container delivery pressure is ensured for the constant mass flow regulation.

The pressure measuring probe for the metering container delivery pressure is therefore arranged in the area of the delivery device for the purpose of eliminating the variable hydrostatic pressure of the metering container bulk fill. In order that the overpressure in the airlock in relation to the metering container, which is required for refilling the metering container from the airlock, in order to cause a dust flow to begin, cannot be displaced in the metering container up to the delivery device and thus induce a metering container delivery pressure which deviates from the target value for the total mass flow regulation, a pressure increase occurring in the metering container due to the refilling procedure is rapidly dissipated again by the pressure regulation device by rapid readjustment of the metering container pressure, in that a gas stream corresponding to the pressure increase is permitted to escape through the depressurization gas line, for example, by opening a large regulating valve.

By means of this method, the continuous, dosed supply of dusts of light, polydisperse particles can be performed in reactors of arbitrary operating pressure, these dusts also being easily perfused because of their large void volume of greater than 94% and their particles having a tendency to float easily because of the low gross density 200-800 kg/m$^3$, so that up to this point, hardly any or no bulk material flow from delivery openings could be achieved in the prior art because of the low gravity pressure and the ability of the particles to easily form wedges.

Figure 1:
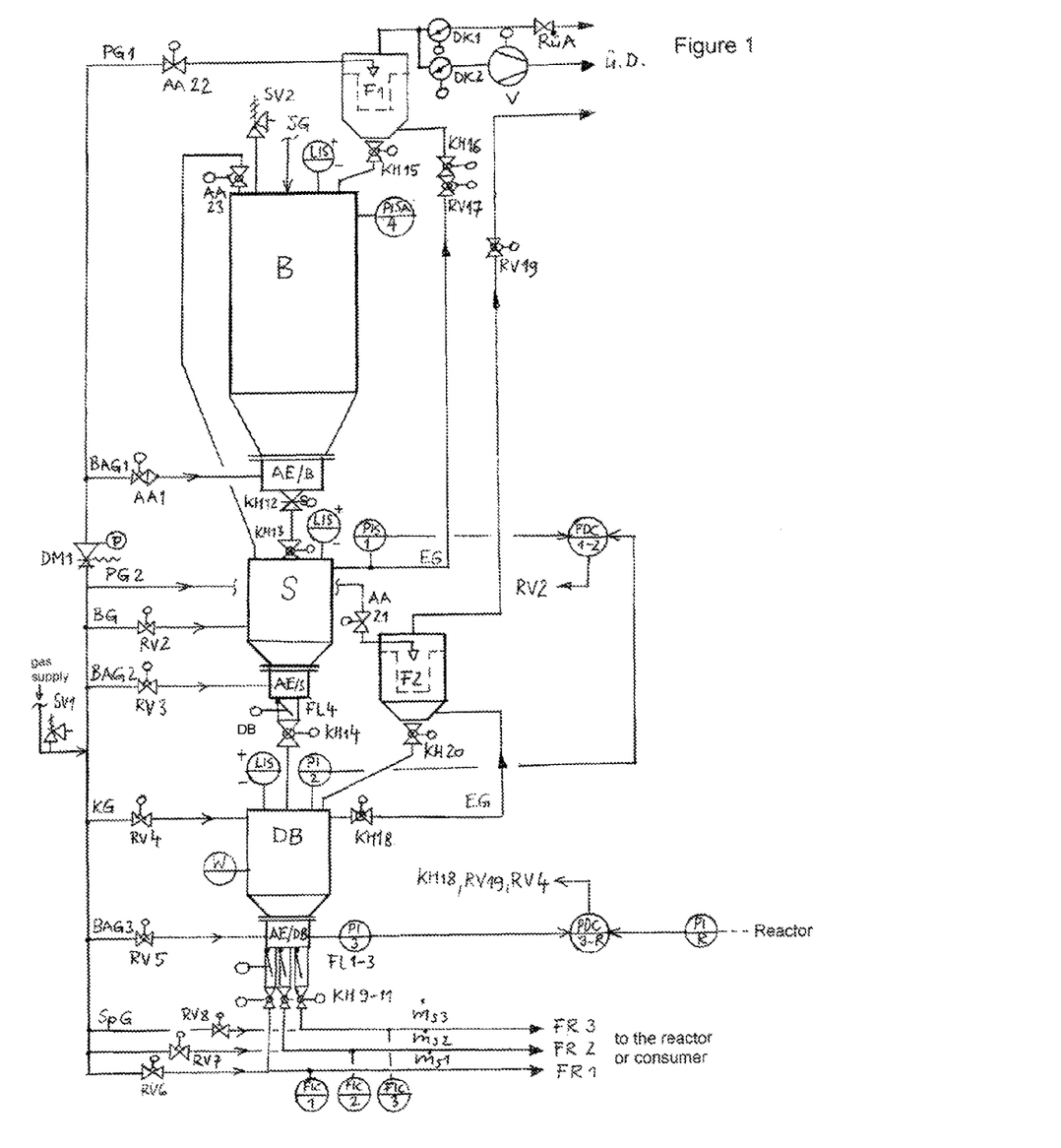
FIG. 1 shows a method flow chart of an embodiment of the dense phase conveying system according to the invention.

With reference to FIG. 1, such a method can be performed by using a bunker B having a delivery device AE/B, an airlock S having a delivery device AE/S, and a metering container DB having a delivery device AE/DB. Above the delivery device AE/B, ventilation of the bunker bulk fill is initiated by means of an acceleration and delivery gas BAG 1 via the ventilation elements BE/SiR (cf. FIG. 2), while a partial vacuum is applied in the airlock S to be filled, with open valves KH12, KH13, KH16, RV17, using the ventilator V, which comprises a filter F1 for entrained dust, for the purpose of generating a bulk material flow toward the airlock S.

After achieving the maximum fill level LIS+/S in the airlock S, the said valves are closed again and the filled airlock S is brought to the operating pressure PI2 prevailing in the metering container DB by means of pressurization gas BG by opening the regulating valve RV2, but predominantly using acceleration/delivery gas BAG2. Then, by supplying further gas, an overpressure corresponding to the differential pressure PDC 1-2=PIS1−PI2 is set and kept regulated in the airlock S in relation to the metering container DB, so that after reaching the minimum fill level LIS−/DB at the metering container DB, the ball valve KH14 is opened and the dust flow regulation device FI4, which can be a FLUSOMET® regulating unit, for example, is regulated in order to set the filling stream toward the metering container DB into motion in a defined manner, which is interrupted again upon reaching the maximum fill level LIS+/DB of the metering container DB by closing the ball valve KH14. The solid delivered with the exhaust gas from the metering container DB is held back in the filter F2, in order to protect the depressurization valves, for example, the regulating valve RV19.

The mass flow regulation is performed using a variable differential pressure PDC 3-R between metering container PI3 and reactor PIR and using variable degrees of opening of the dust flow regulation devices FI1, FI2, FI3, which can each be FLUSOMET® regulating units, the compensation gas KG being increased toward the metering container DB for mass flow increase and the depressurization gas EG from the metering container DB via the pressure filter F2 being increased for mass flow reduction.

Before entering the conveying tubes FR1, FR2, FR3, the dust is ventilated somewhat, homogenized, and dosed in the delivery devices AE/DB.

At higher operating pressures, the depressurization gas released from the airlock S can be captured and recompressed to be used as operating gas BG, SpG, BAG2, BAG3 again, at least two airlocks S then having to be installed.

A weighing system W can be used for monitoring the fill level LIS of the metering container DB and measuring the total mass flow, which is composed of the sum of the individual mass flows in the conveying tubes FR1, FR2, FR3. It is possible that a different, but defined mass flow FIC1, FIC2, FIC3 can be set in each conveying tube FR1, FR2, FR3 by means of the dust flow regulation devices FI1, FI2, FI3 at the same time, in that the degrees of opening of the dust flow regulation devices FI1, FI2, FI3 are varied, but the differential pressure PDC3-R between metering container DB and reactor is kept stable and constant.

Figure 2:
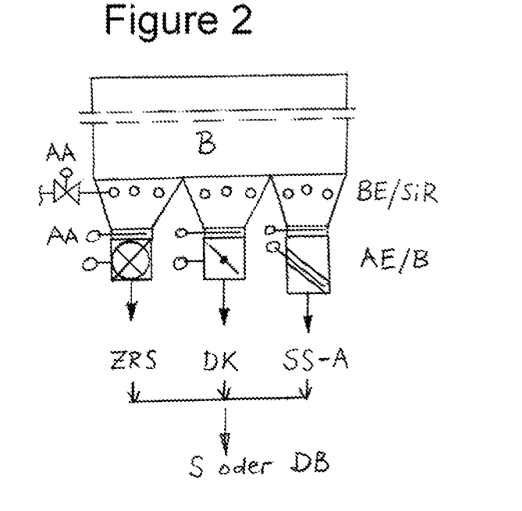
FIG. 2 shows a schematic detail view of the delivery device of the bunker.
Figure 3:
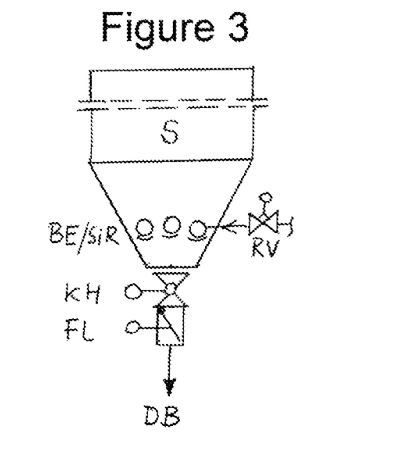
FIG. 3 shows a schematic detail view of the delivery device of the airlock.

FIG. 2 shows that the bunker B has at the outlet ventilation devices BE/SiR, which can comprise arched, porous sintered metal tubes, and delivery devices AE/B, which can be throttles such as Y-type valves SS-A, butterfly valves DK, or under certain circumstances rotary valves ZRS. The airlock S, which is shown in FIG. 3, is also equipped in the outlet with ventilation devices BE/SiR made of arched (vault-like formed), porous sintered metal tubes and with the dust flow regulation device FI4 for outflow regulation.

Figure 4:
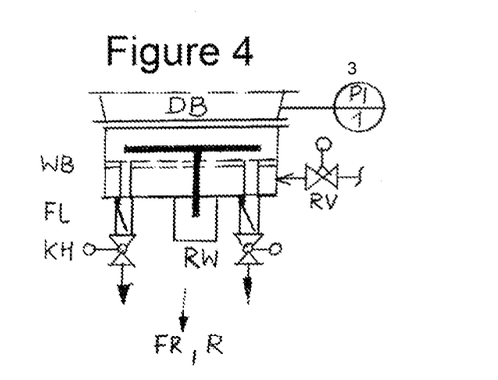
FIG. 4 shows a schematic detail view of the delivery device of the metering container.

The delivery device AE/DB of the metering container DB is illustrated in FIG. 4 and comprises a swirl base WB for fluidization, a stirrer RW for bulk material homogenization, the dust flow regulation device FI1, FI2, FI3 for mass flow regulation in the individual tube, which is performed together with the respective mass flow measuring probes FIC1, FIC2, FIC3 in the conveying tubes FR1, FR2, FR3 (cf. FIG. 1), a regulating valve RV (RV5 in FIG. 1) for the swirl gas quantity supply at the swirl base WB and a pressure measuring point P13 for the regulation of the metering container pressures during pressurization, dosed conveyance, and depressurization. Each mass flow measuring point forms a mass flow controlled system with a dust flow regulation device in the same conveying line. The number of parallel conveying tubes corresponds to the number of the dust flow regulation devices under the metering container DB. Each dust flow regulation device has an adjustable flap having fine actuator, and its free flow channel decreases continuously downstream, is smooth and wear-resistant, and does not offer any possibilities to the solid stream for forming wedges and swirling.

In general, the pressurization and compensation gases can be introduced horizontally into the airlock and into the metering container and can be supplied diffusely distributed and as much as possible above the bulk fills, so that more intensive swirling having a speed of greater than 0.01 m/s and jet formation into the bulk fill having a speed greater than 0.5 m/s are not generated.

In the present case, one metering container is sufficient for the conveyance to the consumer. The metering container opens into one or more conveying tubes, which extend to the consumer. The conveyance of the dust from the metering container to the consumer is activated and maintained by a delivery device on the metering container lower part, which consists of a swirl base for fluidization, a stirrer for bulk material homogenization or gas admixing, a dust flow regulation device, in particular a FLUSOMET® regulating unit for mass flow regulation in the individual tube and for equalizing the dust streams of the conveying tubes to one another, a regulating valve for the acceleration/delivery gas quantity supply (swirl gas) at the swirl base, and pressure measuring points for the regulation of the metering container pressures during pressurization, dosed conveyance, and depressurization.

The mass flow measuring probes in the conveying tubes and the FLUSOMET® regulating units on the metering container outlet together form mass flow controlled systems. Depending on the degree of opening of the FLUSOMET® regulating unit, a driving pressure differential is induced between metering container and conveying tube as the drive for the dust stream from the metering container. In contrast, an excessively large outlet opening and an excessively large degree of opening of the FLUSOMET® of the airlock results in an actual gas breakthrough and therefore in pressure equalization between airlock and metering container. The dust refilling collapses, which is prevented by throttling at the airlock delivery unit.

The swirl gas speed at the swirl base is set to between 0.1 and 1.0 times the gas speed at the loosening point. This low speed shall not be exceeded, so that excessively strong swirling of the light, small particles is not caused. The gas speed at the loosening point of the dusts handled here is less than 0.01 m/s.

An exemplary embodiment which is described hereafter on the basis of FIGS. 1 to 4 is to illustrate the invention, but is not to restrict the scope of protection.

An entrained flow gasification reactor R is charged with a total of 2500 kg/h bio-coke via three identical conveying tubes FR1, FR2, FR3. At a bulk density of 340 kg/m$^3$ the bio-coke stream corresponds to a bulk material volume stream of 7.35 m$^3$/h. The operating pressure PI-R in the reactor is 5 bar and is always constant, i.e., PI-R is the reference pressure of the system.

The gross volume of the metering container DB is 6.0 m$^3$, that of the airlock S is 4.0 m$^3$, and that of the bunker B is 80 m$^3$. The number of the airlock actions to the metering container DB is approximately 2.5/h, if the refilling to the metering container DB always begins at a minimum fill level LIS-/DB of 25% and is ended at a maximum fill level LIS+/DB 75%, which corresponds to the net volume of the airlock S.

The bulk material or the dust SG is pneumatically conveyed from a degasification system into the bunker B. The conveyor gas is exhausted to the filter F1, the dust is deaerated and settles down in the bunker B. The dust supply is controlled using the MIN-/MAX fill level monitor LIS of the bunker B.

If the fill level probe of the airlock S indicates the fill level minimum LIS−/S, the airlock S is totally depressurized via the valves KH16 and RV17 and refilled via the butterfly valve DK of the delivery device AE/B. Before this refilling, the dust is slightly loosened using the ventilation device BE/SiR via the delivery device AE/B using acceleration/delivery gas BAG1, the airlock S is forced to have a partial vacuum using the ventilator filter V, F1, the butterfly valve DK is partially opened in accordance with the required outlet stream and the outflow is started using the opening of the ball valves KH12 and KH13.

Upon reaching the maximum fill level LIS+/S in the airlock S, all valves to the surroundings of the airlock S and to the bunker B close i.e., valves KH12, KH13, KH16, RV17 close and ventilator V shuts down. The airlock S is immediately brought to the pressure PI-2, as is applied in the metering container DB, using pressurization gas BG, but predominantly using acceleration/delivery gas BAG2. The supply of the pressurization gas BG occurs horizontally and above the dust bulk fill in the airlock.

Upon reaching the fill level in the metering container DB of LIS−/DB 25%, the request for dust from the airlock S occurs. By means of pressurization gas BG and opening the regulating valve RV2, the airlock pressure PIS-1 is increased by at most 1.0 bar in relation to the metering container pressure PI2 and is kept constant using the regulation PDC1-2; however, the airlock pressure PIS-1 can also be lowered using the regulation PDC1-2 during the refilling procedure in the metering container DB with open ball valve KH14 via the regulating valve RV17. The FLUSOMET® regulating unit F14 of the delivery device AE/S opens sufficiently that the required outflow stream is achieved and kept stable after opening the KH14. During the refilling in the metering container, a volume, which corresponds to the incoming dust and gas volumes, of depressurization gas EG is exhausted from the metering container DB using the regulation PDC 3-R via the regulating valve RV19, so that the metering container pressure PI2 and the airlock pressure PIS-1 do not equalize. The outflow in the metering container DB would then come to a standstill. At the fill level LIS/DB of 75% in the metering container DB, the airlock S is decoupled from the metering container DB, depressurized, and refilled.

The metering container DB conveys the dust to the burners of the gasification reactor R without interruption and continuously using at least 0.5 bar overpressure PDC 3-R by means of the three conveying tubes. The steadiness and precision of the metering is achieved using the delivery devices AE/DB, in that the dust is homogenized using the stirrer RW, acceleration/delivery gas BAG3 is admixed by opening the regulating valve RV5, and equal dust streams are regulated using the FLUSOMET® regulating units FI1, FI2, FI3 in combination with the dust stream measuring points FIC-1, FIC-2, FIC-3. The differential pressure PDC 3-R between metering container DB and consumer R is kept constant during the metering at the value which is required for the total mass flow by the differential pressure regulation PDC3-R using compensation gas KG via actuation of the regulating valve RV4. However, it is at a level at which the FLUSOMET® regulating units can increase or reduce the mass streams in the individual conveying tubes by increasing or decreasing their degree of opening. The level of the differential pressure PDC 3-R is a function of the size of the total mass flow and the length of the conveying tubes FR1, FR2, and FR3. The supply of compensation gas KG into the metering container occurs horizontally and above the dust bulk fill.

The function of the fill level probe of the metering container LIS/DB can also be taken over or assisted by the weighing device W or the weighing device W can be used as a generator of a redundant measuring signal, if a clear fill level measuring signal cannot be displayed in the event of difficult dust parameters.

LIST OF REFERENCE NUMERALS

SG dust, bulk material, supply device
B bunker, supply device
S airlock
DB metering container
F filter
V ventilator, suction device
BE ventilation element
AE delivery device
AA shutoff valve, slide
RV regulating valve
KH ball valve
Rü A check valve
DM pressure mediator
SV safety valve, overpressure safety device
FI dust flow regulation device, FLUSOMET® regulating unit
  measuring points:
  L: fill level, F: volume/mass flow,
  P: pressure, PD: differential pressure, W: weighing
DK butterfly valve for gas or solid stream regulation
PG pulsed gas for filter cleaning
EG depressurization gas (pressure reduction)
BG/KG pressurization/compensation gas (pressure increase)
SpG flushing or conveyor gas
BAG acceleration/delivery gas
FAG fluidization/delivery gas
FR dust conveying tube
ZRS rotary valve
SS-A Y-type valve
SiR sintered metal tube for bulk material ventilation
WB swirl base (fluidization device)
RW stirrer
R reactor, consumer

The invention claimed is:

1. A metering device comprising a metering container, at least one airlock arranged upstream of the metering container, a supply device, and a pressure regulation device for regulating a differential pressure between the metering container and a consumer,
    wherein the metering container provides for the steady, continuous, dosed supply of the bulk material in a powder form made of light, polydisperse particles from the supply device into a plurality of conveying tubes to a consumer arranged downstream of the conveying tubes,
    wherein a mass flow measuring probe is arranged on each conveying tube,
    wherein the metering container and the airlock each comprise a delivery device,
    wherein the delivery device corresponding to the metering container comprises a plurality of dust flow regulation devices associated with the plurality of the conveying tubes,
    wherein each dust flow regulation device is associated with a respective conveying tube and opens therein,
    wherein the mass flow measuring probe of each conveying tube is coupled to a dust flow regulation device, which opens into the corresponding conveying tube, and
    wherein the delivery device of the airlock is connected via a dust flow regulation device into the metering container,
    wherein the pressure regulation device is coupled to a first pressure measuring device assigned to the airlock and a second pressure measuring device arranged on the metering container for a first differential pressure regulation between an airlock pressure and a metering container pressure and is coupled to a third pressure measuring devices assigned to the delivery devices of the metering container and a fourth pressure measuring devices of the consumer for a second differential pressure regulation between a metering container delivery pressure and a consumer pressure
    wherein the regulation of the differential pressure between the metering container and the consumer by the pressure regulation device is comprised by the second differential pressure regulation,
    wherein the metering container pressure is controllable as a function of at least the second differential pressure regulation by the pressure regulation device, and
    wherein the pressure regulation device is coupled to a fifth pressure measuring device assigned to the supply devices and the first pressure measuring devices of the airlock for a first differential pressure control between a supply device pressure and the airlock pressure
    wherein the metering device comprises at least one suction device that is coupleable with the airlock and capable of generating a partial vacuum in the airlock in relation to a pressure in the supply device, by means of actuating devices that comprise a plurality of regulating and shut-off valves in a pressurization gas line, depressurization gas line, and a swirl gas line or acceleration and delivery gas line leading to the airlock and that are activatable by the pressure regulation device, and wherein the airlock pressure is controllable by the pressure regulation device as a function of at least one airlock fill level and the first differential pressure control by an actuation of the at least one suction device and actuation of the plurality of regulating and shutoff valves.

2. The metering device according to claim 1, wherein the airlock and the metering container are connected via a filling line, which has a closing device, which can be actuated at least as a function of the airlock pressure, a metering container pressure, the metering container fill level, and/or the airlock fill level.

3. The metering device according to claim 2, wherein the closing device and the dust flow regulation device of the airlock are operatively coupled to one another via a control device, a filling mass flow into the metering container being provided as a function of the metering container fill level, the airlock fill level, and/or the pressure differential.

4. The metering device according to claim 1, wherein the pressure regulation device actuates a plurality of regulating and shutoff valves in a pressurization gas line, a depressurization gas line, and a swirl gas line to the metering container, and is operatively coupled to the mass flow measuring probes and/or a measuring device for the total mass flow.

5. The metering device according to claim 1, wherein the delivery device of the metering container comprises a swirl base and a stirring device arranged above the swirl base, a swirl gas line opening into the delivery device below the swirl base, and comprises a plurality of closure devices assigned to the dust flow regulation devices, the dust flow regulation devices being coupled to the pressure measuring device of the delivery device and to a measuring device for a total mass flow.

6. The metering device according to claim 1, wherein the delivery device of the airlock comprises a ventilation device, into which the swirl gas line opens, and which comprises the closure device arranged upstream or downstream from the dust flow regulation device, at least the ventilation device being coupled to the pressure regulation device.

7. The metering device according to claim 1, wherein the dust flow regulation device has a smooth and wear-resistant flow channel having an adjustable flap having a fine actuator, the flow channel continuously decreasing in size downstream.

8. The metering device according to claim 5, wherein a compensation gas line opens horizontally into the metering container above a dust bulk fill present over the swirl base and a pressurization gas line opens horizontally into the airlock above a dust bulk fill present over the delivery device in such a manner that a compensation gas and a pressurization gas can be introduced diffusely distributed.

9. The metering device according to claim 1, wherein the light, polydisperse particles have a void volume in a range up to 94% and a gross density of 200 to 800 kg/m$^3$.

10. A dense phase conveying system for the steady, continuous, dosed supply of a bulk material in powder form made of light, polydisperse particles, comprising a bunker, a metering device according to claim 1 that is connected to the bunker serving as the supply device, and conveying tubes extending from the metering device to a consumer, wherein the bunker comprises a ventilation element and at least one bunker delivery device, which is connected via a filling line having at least one closure device to the airlock of the metering device, and at least the bunker delivery device which is coupled to the pressure regulation.

11. A method for the steady, continuous, dosed supply of a bulk material in a powder form made of light, polydisperse particles using a dense phase conveying system, the method comprising providing a dense phase conveying system comprising a bunker, a bunker delivery devices, a metering device according to claim 1 connected to the bunker which serves as the supply device, and conveying tubes extending from the metering device to a consumer, wherein the bunker comprises a ventilation element and at least one closure device to the airlock of the metering device, wherein at least the bunker delivery device is coupled to a pressure regulation device, providing a steady, continuous, dosed supply of bulk material resulting from coupled and concerted operation of the airlock and the metering container of the metering device, applying bulk material alternately and successively to the at least one airlock and the metering container in a controlled manner as a function of the airlock fill level and the metering container fill level, by (i) putting the airlock under partial vacuum in relation to the supply device by actuating the suction device, upon reaching a fill level minimum of the airlock, for filling bulk material thereto, and, (ii) putting the airlock on an overpressure in relation to the operating pressure of the metering container upon a fill level maximum of the airlock, by applying pressurization gas from the pressurization gas line and/or swirl gas from the swirl gas line thereto, and providing a filling mass flow into the metering container, upon reaching a fill level minimum of the metering container from the airlock, to which overpressure is applied, (i) by opening a closing device of a filling line between the airlock and the metering container and (ii) by operatively coupled actuation of the dust flow regulation device of the airlock controlled by the control device.

12. The method according to claim 11, wherein the closing device closes the filling line upon reaching a fill level maximum of the metering container.

13. The method according to claim 11, wherein the differential pressure between the delivery pressure in the delivery device of the metering container and the consumer pressure is kept constant during the filling, and the individual mass flows in the conveying tubes are regulated by the dust flow regulation devices of the metering container, the steady, continuous, dosed supply to the consumer being provided.

* * * * *